Patented May 26, 1953

2,640,031

UNITED STATES PATENT OFFICE 2,640,031

HYDROLYSIS RESISTANT HEAT TRANSFER COMPOSITION

Ettore Da Fano, Raritan, N. J., assignor to John B. Pierce Foundation, New York, N. Y., a corporation of New York No Drawing. Application February 9, 1950, Serial No. 143,345

3 Claims. (Cl. 252—78)

This invention relates to a preparation suitable for use as a heat transfer fluid, and which is adapted, among other uses, as the coolant in the radiator of an internal combustion engine.

It is an object of the present invention to provide a composition that maintains its fluidity at the low temperatures to which it is apt to be subjected under climatic conditions normally encountered.

It is a further object of the invention to provide a composition, which in addition has a high boiling point, and which, therefore, does not evaporate under normal conditions of use as the coolant in an internal combustion engine.

Still a further object of the invention is to provide a composition, which in addition to the above properties, has a relatively low viscosity over the temperature range to which it may be subjected, particularly at low temperature conditions.

A further object of the invention is to provide a composition which also is relatively inert chemically and in particular is resistant to hydrolysis or other forms of decomposition in the presence of other materials, particularly water.

Still a further object of my invention is to provide a composition which is economical and easy to manufacture on a commercial scale and which having the above properties is especially suitable as a coolant in an automobile radiator.

The above and other objects are admirably satisfied by a tetra-isoalkyl orthosilicate of the constitution to be described more particularly hereinafter.

The Johnston U. S. Patent No. 2,335,012, discloses tetra-aryl orthosilicates and their preparation, as well as various mixtures thereof. The tetra-aryl orthosilicates are relatively unstable towards water. The hydrolyzed products are insoluble and this instability readily leads to clogging of the cooling system of an automobile engine containing such a fluid, if a small amount of water were present in the radiator when the fluid were added or if the water were subsequently added by mistake or through condensation. It is extremely difficult or impractical to remove the hydrolysis product formed when such orthosilicates are decomposed, and this may result in the automobile radiator and engine block being ruined.

It has also been proposed to employ alkylaryl orthosilicates as automotive coolants. While these have desirable boiling and fluidity properties and are somewhat superior to the aryl orthosilicates with respect to hydrolysis, they leave much to be desired in this respect.

The tetra-isopropyl orthosilicate has been found to be extremely resistant to hydrolysis. However, this possesses a fairly sharp freezing point of about —7° F., and is therefore unsuitable as an engine coolant because such a material normally must remain fluid at lower temperatures.

It has been found, in accordance with this invention, that tetra-isopropyl-isobutyl orthosilicates provide compositions having the desired stability and fluidity. Such compositions have a boiling point above about 375° F. and have a freezing point well below that which is encountered in any ordinary climatic conditions. In addition, and what is particularly important, these silicate compositions are entirely satisfactory from the standpoint of resistance to hydrolysis in the presence of water. The introduction of the isobutyl radical, although it is not symmetrical as is the isopropyl radical, does not interfere with the hydrolysis-resistant characteristic to any marked extent.

It has been observed that at elevated temperatures any mixture of organic orthosilicates tends to disproportionate due to interchange of organic radicals, and that equilibrium of various possible compounds will be present in certain relative proportions. In order to understand this phenomena, reference may be had to the preparation of the orthosilicates which may be represented as follows:

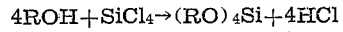

$$4ROH + SiCl_4 \rightarrow (RO)_4Si + 4HCl$$

where ROH is isopropyl or isobutyl alcohol.

Where a mixture of isopropyl or isobutyl alcohols are used in the preparation, as is the case with the instant invention, the following compounds are possible:

1. Tetra-isopropyl orthosilicate $$(C_3H_7O)_4Si$$

2. Tri-isopropyl mono-isobutyl orthosilicate $$(C_3H_7O)_3SiOC_4H_9$$

3. Di-isopropyl di-isobutyl orthosilicate $$(C_3H_7O)_2Si(OC_4H_9)_2$$

4. Mono-isopropyl tri-isobutyl orthosilicate $$C_3H_7OSi(OC_4H_9)_3$$

5. Tetra-isobutyl orthosilicate $$(C_4H_9O)_4Si$$

The ratio of the number of isopropyl radicals in gram radical weights to the number of isobutyl radicals in gram molecular weights should be such that at least one gram radical weight of the isobutyl radical is present and the balance being the isopropyl radical. Up to 3 gram radical weights of the isobutyl radical may be present, but in view of the greater cost of isobutyl alcohol it will be readily apparent that it is advantageous to keep this amount as low as possible.

The following proportions of isopropyl and isobutyl radicals in the mixture of the silicates fall within the requirements of the invention and have been found to have the desired fluidity or low viscosity at low temperatures, the desired high boiling point and the desired stability against hydrolysis in the presence of water:

*Radicals*

[Gram radical weights]

| Example No. | Isopropyl | Isobutyl | Silicate (SiO$_4$) |
|---|---|---|---|
| 1 | 10 | 6 | 4 |
| 2 | 12 | 4 | 4 |
| 3 | 11 | 5 | 4 |
| 4 | 8 | 8 | 4 |
| 5 | 4 | 12 | 4 |

The desired heat transfer fluid for use as a coolant in an automobile may be made by reacting silicon tetrachloride with the desired mixture of isopropyl and isobutyl alcohols or by mixing the tetraisopropyl orthosilicate with tetraisobutyl orthosilicate in the desired proportions and then carrying out the disproportionation reaction.

In the first method referred to of making the silicates from the starting alcohols and silicon tetrachloride, it is preferred that the reaction be conducted out of contact with iron. The alcohols are reacted with silicon tetrachloride in the desired proportions, preferably using an excess of the alcohols. The silicon tetrachloride may be added gradually to the mixture of alcohols with agitation. The reaction is initially exothermic and efficient cooling is necessary. When the reaction is about half through, it becomes endothermic and heating is necessary. After all of the reactants are mixed, the reaction mixture is heated to drive off the residual by-product hydrogen chloride, and the excess of the alcohols is removed by distillation.

Alternatively, the mixture of alcohols may be added gradually to the silicon tetrachloride.

Near the end of the reaction, metallic sodium or a sodium compound of one or both of the two alcohols (sodium alcoholate) may be added, and this assists in bringing the reaction to completion and removing the last traces of chlorinated compounds.

The reactants may be pure or technical grade materials and may contain small amounts of water, in which case polymers may be formed but their presence does not seem harmful in small amounts since they do not materially affect the stability of the mixture against hydrolysis nor do these small amounts tend to alter materially the viscosity or the solidification or boiling point of the mixture.

*Example 1*

A reaction vessel was charged with 2½ mols of isopropyl alcohol and 1½ mols of isobutyl alcohol. The reaction vessel was equipped with a mechanical agitator and could be heated or cooled at will. It was provided with a condenser system suitable for both reflux and distillation, as well as an alcohol trap to absorb and react with any entrained silicon tetrachloride. The reaction vessel was also provided with a suitable drying tower leading to the atmosphere to prevent moisture from entering the reaction chamber.

After charging the mixture of alcohol to the reaction vessel, the mixture is agitated and the condenser connected with reflux to the acid absorber through the alcohol trap which contains 10% excess of the total combined weights of the alcohol, and the drying towers are adjusted so that no moisture can enter the system.

The reaction vessel is cooled to about 0° C., at which point the silicon tetrachloride is added at such a rate that the temperature does not exceed 25° C. The first portion of the reaction is highly exothermic and the addition of the silicon tetrachloride takes some time depending upon the cooling facilities. After 1 mol of silicon tetrachloride has been added, the reaction system is brought to room temperature and heated to a temperature of about 125° C. to expel hydrogen chloride. The reaction mixture is then allowed to reflux for several hours.

The condenser is then arranged for distillation and any unreacted materials are stripped off and the reaction mixture cooled. If desired, excess alcohols in the same proportions may be added and refluxed and then stripped off.

After the reaction is complete, the reaction mixture is washed with water until the water phase is neutral and the liquid then dried and filtered. The resultant silicate is a clear liquid of pleasing odor, which is obtained in yield approaching theoretical.

The liquid has a boiling point of 379.4° F. and is a clear fluid at −94° F. It has a viscosity of 9.6 centistokes at −31° F., 1.9 centistokes at 77° F., and 1.0 centistoke at 167° F.

*Example 2*

Following the same general procedure as Example 1, but employing 3 mols of isopropyl alcohol and 1 mol of isobutyl alcohol, a product is obtained having a cloud point of −31° F. and becoming slightly slushy at −80° F. The boiling point is 372.2° F. The viscosity is 6.4 centistokes at −31° F., 1.8 centistokes at 77° F., and 0.8 centistoke at 167° F.

*Example 3*

Following the same general procedure as in Example 1, the reaction mixture is prepared utilizing 4 mols of silicon tetrachloride, 11 mols of isopropyl alcohol and 5 mols of isobutyl alcohol. The product has a cloud point of −44° F. and is slushy at −87° F. It has a boiling point of 375° F. and a viscosity of 8.5 centistokes at −31° F., 1.9 centistokes at 77° F., and 0.85 centistoke at 167° F.

*Example 4*

Following the same general procedure as in Example 1, a composition is made employing 2 mols each of isopropyl and isobutyl alcohol. The composition has a boiling point of 388.4° F. and is a clear fluid at −94° F. It has a viscosity of 12.1 centistokes at −31° F., 2.2 centistokes at 77° F., and 1.0 centistoke at 167° F.

*Example 5*

Following the same general procedure as in Example 3, a composition is made using 4 mols of isopropyl alcohol and 12 mols of isobutyl alcohol. The composition has a boiling point of 422.6° F., and a viscosity of 16.5 centistokes at −77° F., 2.7 centistokes at 77° F., and 1.2 centistokes at 167° F.

In preparing the compositions by the second alternative method, the same general procedure is followed except that only isopropyl alcohol is used in preparing the tetraisopropyl orthosilicate and only isobutyl alcohol is used in preparing the tetra-isobutyl silicate. The amounts of the pure isopropyl and isobutyl orthosilicates to give the desired proportion are mixed together and permitted to transesterify or disproportionate. The reaction is slow in the absence of a catalyst but is more rapid under reflux conditions, especially if the last trace of chlorosilicates formed during the reaction are not removed until after the disproportionation is complete. The chlorosilicates act as disproportionation catalysts and can be removed later by washing with water or by treatment with sodium or an alcoholate.

It is important to note that the liquid does not need to be distilled except for removing the excess alcohols. It is sufficiently purified by several washes with water, the first of which removes any chlorine-containing compounds. Because of the resistance of the composition to hydrolysis, there is no deleterious effect due to the water wash. After the washing, it is recommended that the composition be finished by filtering.

I claim:

1. A heat transfer medium which is resistant to hydrolysis by water, and which has a freezing point below about −62° F., a boiling point above about 372° F., a viscosity at −31° F., below about 16.5 centistokes, and a viscosity at 77° F. within the range of about 1.8 to about 2.7 centistokes, consisting essentially of a mixture of tetra-isopropyl orthosilicate, tri-isopropyl mono-isobutyl orthosilicate, di-isopropyl di-isobutyl orthosilicate, mono-isopropyl tri-isobutyl orthosilicate and tetra-isobutyl orthosilicate, the isopropyl and isobutyl radicals in all of the compounds of the said mixture being in the proportion of from 1 to 3 isopropyl radicals to from 3 to 1 isobutyl radicals.

2. The heat transfer medium of claim 1 wherein the proportion of isopropyl to isobutyl radicals is in the ratio of from 3 to 2 isopropyl radicals to from 1 to 2 isobutyl radicals.

3. The heat transfer medium of claim 1 especially adapted for use as an automotive engine coolant having a freezing point below about −94° F., a boiling point above about 375° F. and a viscosity below about 9.6 centistokes at −31° F. and below about 1.9 centistokes at 77° F., in which the proportion of isopropyl to isobutyl radicals is 2.5 to 1.5.

ETTORE DA FANO.

References Cited in the file of this patent

UNITED STATES PATENTS

| Number | Name | Date |
|---|---|---|
| 2,053,474 | Graves | Sept. 8, 1936 |
| 2,335,012 | Johnston | Nov. 23, 1943 |
| 2,349,338 | Clapsadle | May 23, 1944 |
| 2,566,364 | Pedlow | Sept. 4, 1951 |

OTHER REFERENCES

Backer: "Rec. Trav. Chim. des Pays Bas," vol. 61, 1942, p. 512.

Havill: "Jour. Org. Chem.," vol. 13, 1948, p. 282.

Post: "Silicones and Other Organic Silicon Compounds," 1949, pages 149–152.